United States Patent [19]

Uchikoshi et al.

[11] Patent Number: 4,659,972
[45] Date of Patent: Apr. 21, 1987

[54] SERVO SYSTEM FOR POSITIONING AND DRIVING A MOVABLE MEMBER USING TWO REFERENCE VOLTAGES

[75] Inventors: Gohji Uchikoshi, Higashimurayama; Akio Terada, Tokyo, both of Japan

[73] Assignee: Nakamichi Corporation, Kodaira, Japan

[21] Appl. No.: 807,810

[22] Filed: Dec. 11, 1985

[30] Foreign Application Priority Data

Dec. 17, 1984 [JP] Japan .......................... 59-190943[U]

[51] Int. Cl.$^4$ ...................... G05B 5/01; G11B 21/08; G11B 21/10
[52] U.S. Cl. .................................. 318/616; 369/32; 369/33; 369/41; 369/44; 360/77; 360/78; 318/607
[58] Field of Search ............... 360/75, 77, 78; 369/32, 369/33, 41–47; 318/561, 592, 596, 607, 616–618, 620, 621

[56] References Cited

U.S. PATENT DOCUMENTS 4,355,273 10/1982 DuVall ............................. 318/561
4,386,300  5/1983 Ogawa ............................. 318/617
4,397,009  8/1983 Eriksson .......................... 369/32

Primary Examiner—Raymond F. Cardillo
Assistant Examiner—Steven R. Garland
Attorney, Agent, or Firm—Pearne, Gordon, McCoy & Granger

[57] ABSTRACT

This invention relates to a servo system for positioning and driving a movable member such as a pickup head of an optical reading system, for example. A sinewave signal is generated by a position detector in response to movement of the movable member. A first reference signal is used with the sinewave signal to position the movable member. A second reference signal is used with a modified signal which is generated by differentiating and rectifying the sinewave signal, to drive the movable member.

4 Claims, 4 Drawing Figures

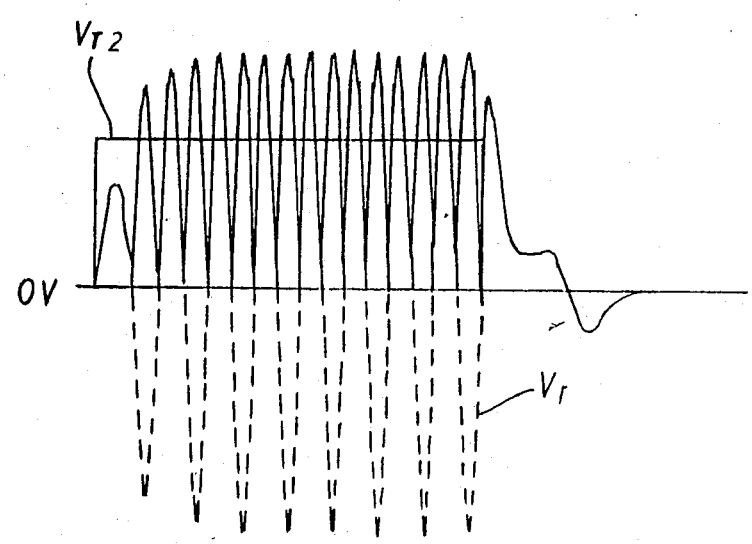

SERVO SYSTEM FOR POSITIONING AND DRIVING A MOVABLE MEMBER USING TWO REFERENCE VOLTAGES

BACKGROUND OF THE INVENTION

In an optical reading system, for example, an optical pickup head is controlled in a radial direction to precisely follw any of a plurality of information tracks spirally formed on a rotatable disc in a normal playback mode and controlled in the same direction to move from one track position to another track position in an access mode. Such a syetem is disclosed in U.S. Pat. No. 4,397,009. In the U.S. Patent, a tracking zero signal of sinewave is detected in response to the radial movement of the pickup head relative to the rotatable disc and utilized to control the position of the pickup head. However, such a prior system is required to be separately provided with a positioning servo loop to control the pickup head so as to maintain the pickup head on an information track and a driving servo loop to move the pickup head to another position. Thus, it will be noted that the whole servo system is complicated and has many parts, which causes the servo system to be expensive.

SUMMARY OF THE INVENTION

Accordingly, it is a principal object of the invention to provide a servo system for positioning and driving a movable member adapted to be simplified by positioning and driving the movable member by means of a single servo loop and therefore inexpensively obtained without many parts.

Another object of the invention is to provide a servo system for positioning and driving a movable member adapted to drive the movable member at constant velocity.

In accordance with the present invention, there is provided a servo system for positioning and driving a movable member comprising means to generate a position signal of sinewave in response to movement of said movable member with a frequency of said position signal depending on a velocity of movement of said movable member; means to differentitate said position signal of sinewave and to rectify the thus differentitated signal to generate a modified signal; means to selectively generate one of first and second reference signals of different DC voltage; means to selectively compare said position signal with said first reference signal to generate a first control signal and said modified signal with said second reference signal to generate a second control signal; and means to control said movable member to position said movable member in response to said first control signal and to drive said movable member in response to said second control signal.

BRIEF DESCRIPTION OF THE DRAWINGS

The above and other objects and features of the invention will be apparent from the description of the embodiment taken along with reference to the accompanying drawings in which;

FIG. 4 shows waveforms of the servo system of FIG. 1.

DETAILED DESCRIPTION OF THE EMBODIMENT

Figure 1:
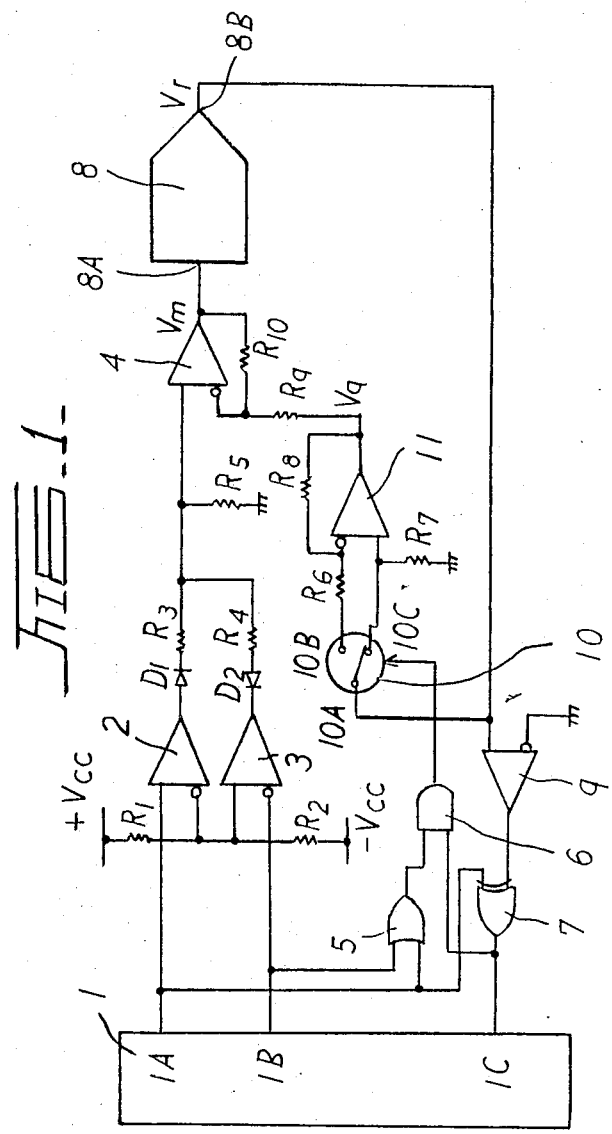
FIG. 1 is a schematic diagram of a servo system for positioning and driving a movable member contructed in accordance with a preffered embodiment of the invention.
Figure 2:
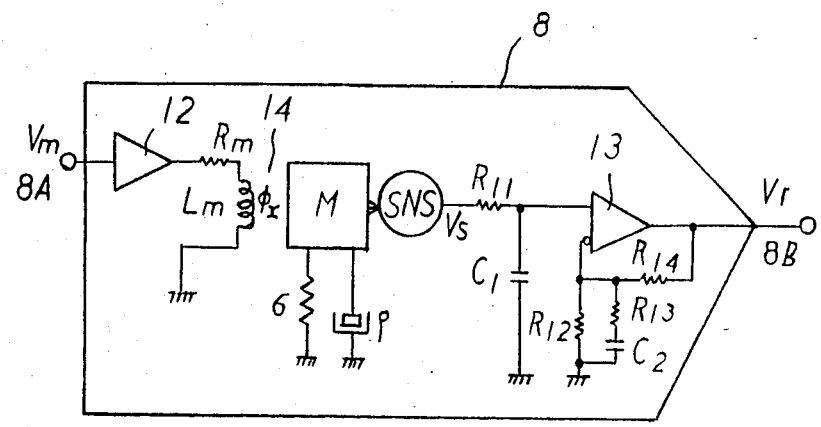
FIG. 2 is a detail diagram of a controlled section used for the servo system of FIG. 1.

Referring now to FIG. 1, there is shown a servo system for positioning and driving a movable member such as a pickup head for an optical reading system, for example. The movable member may be driven by a motor 14 such as a linear motor which is shown in FIG. 2.

The servo system comprises a control 1 and a controlled section 8. The motor 14 is controlled by a power amplifier 12 in the controlled section 8 as shown in FIG. 2. As shown in FIG. 1, an operational amplifier 2 has a (+) input terminal connected to a first output terminal 1A and a (−) input terminal connected through a resistor R1 to a DC potential +Vcc and also through a resistor R2 to a DC potential −Vcc. An output terminal of the operational amplifier 2 is connected through a forwarded diode D1 and a resistor R3 to a (+) input terminal of an operational amplifier 4. An operational amplifier 3 has a (+) input terminal connected through the resistor R1 to the DC potential +Vcc and also through the reistsor R2 to the DC potential −Vcc and a (−) input terminal connected to a second output terminal 1B of the control 1. An output terminal of the operational amplifier 3 is connected through a reversed diode D2 and a resistor R4 to the (+) input terminal of the operational amplifier 4.

The (+) input terminal of the operational amplifier 4 is also grounded through a resistor R5 to earth. The operational amplifier 4 has an output terminal connected through a resistor R10 to a (−) input terminal thereof and also connected to an input terminal 8A of the controlled section 8. The controlled section 8 has an output terminal 8B connected to a (+) input terminal of a comparator 9 and also connected to a movable contact 10A of a switch 10. The comparator 9 has a (−) input terminal grounded to earth.

An OR gate 5 has input terminals connected to the first and second output terminals 1A and 1B of the control 1, respectively. An EXOR gate 7 has input terminals connected to the first output terminal 1A of the control 1 and an output terminal of the comparator 9. The EXOR gate 7 has an output terminal connected to an input terminal 1C of the control 1. An AND gate 6 has input terminals connected to an output terminal of the OR gate 5 and the output terminal of the EXOR gate 7, respectively.

The switch 10 has a fixed contact 10B connected through a resistor R6 to a (−) input terminal of an operational amplifier 11 and a fixed contact 10C connected directly to a (+) input terminal of the operational amplifier 11 and grounded through a resistor R7 to earth. The operational amplifier 11 has an output terminal connected through a resistor R8 to its (−) input terminal and through a resistor R9 to the (−) input terminal of the operational amplifier 4. The operational amplifier 4 forms a differetial circuit together with the resistors R3, R4, R5, R9 and R10. The operation of the switch 10 is controlled by an output signal from the AND gate 6.

In FIG. 2, references Rm and Lm express a resistance and an inductance of a motor coil of the motor 14, respectively, while a reference $\phi x$ expresses a magnetic flux from a motor magnet and can be expressed by the following formula in which reference x expresses displacement of the movable member.

$$\phi x = n \cdot d\phi / dx$$

Furthermore, M expresses mass of the movable member, $\sigma$ expresses stiffness of a spring to support the movable member and $\rho$ expresses mechanical resistance of the spring.

A position sensor SNS generates a position signal Vs of sinewave voltage in response to displacement x of the movable member. A frequency of the position signal Vs depends on a velocity of the movable member. The position signal Vs can be expressed by the folllowing formula in which P expresses pitch between information tracks while Vp expresses a peak voltage.

$$Vs = Vp \cdot \sin(2\pi \cdot x / P)$$

An operational amplifier 13 forms a differetiation circuit together with peripheral components of resistors R12, R13, R14 and a capacitor C2. The differentiation circuit has a predetermined frequency response.

Figure 3:
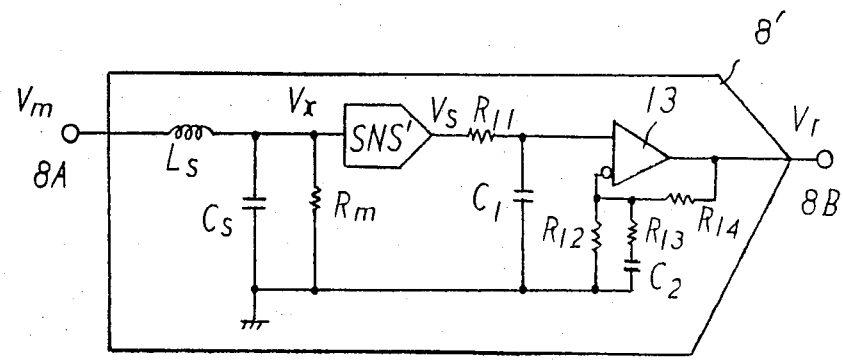
FIG. 3 shows an equivalent circuit of the controlled section of FIG. 2.

FIG. 3 shows an equivalent circuit of the controlled section 8 of FIG. 2. Inductance Ls and capacitance Cs can be determined by resonance frequency and resonance sharpness Q in the circuit of FIG. 2. In FIG. 3, Vm expresses an input voltage while Vx expresses an imaginary voltage proportional to the displacement x of the movable member and can be expressed by the following formula.

$$Wx = x \cdot \sigma \cdot Rm / \phi x$$

A SNS' circuit serves to convert an input signal of imaginary voltage Vx into an output signal of sinewave voltage Vs. The output signal Vs can be generally expressed by A1·sin B1·Vx in which A1 and B1 are constant values, but actually expressed by the following formula in view of a sensitivity of the differentiation circuit and when the value of d Vs/ d Vx is 1 as Vx is equal to 0.

$$Vs = Vp \cdot \sin(Vx/Vp)$$

In operation, level conditions of "High" and "Low" of the signal level will be reffered to "Hi" and "Lo", respectively hereinafter. In the positioning servo mode, the output terminals 1A and 1B of the control 1 have output signals of "Lo". At that time, because of the set value of the resistors R1 and R2, the operational amplifier 2 has an output voltage of $-Vc$ generated while the operational amplifier 3 has an output voltage of $+Vc$ generated. Then, the operational amplifier 4 has a first reference signal Vr of 0 V received at the (+) input terminal thereof. On the other hand, the output terminals of the OR gate 5 and the AND gate 6 are "Lo" and the movable contact 10A of the switch 10 is connected to the fixed contact 10C. Therefore, the operational amplifier 11 serves as a voltage follower of gain 1 and the output voltage signal Vr from the controlled section 8 is introduced through the resistor R9 into the (−) input terminal of the operational amplifier 4 as it is. In this case, since the differentiation circuit serves only as an amplifier due to the low frequency of the output voltage signals Vs from the position sensor SNS, the output voltage signal Vr is one which is produced only by amplifying the output voltage signal Vs from the position sensor SNS. Thus, it will be noted that when the first reference signal Vr of 0 V is applied to the (+) input terminal of the operational amplifier 4 and the output voltage signal Vr is applied to the (−) input terminal of the operational amplifier 4, the servo loop serves as the positioning servo to make the output voltage signal Vr of 0 V whereby the movable member is normally disposed at a zero cross point of positive inclination region of the output voltage signal Vs from the position sensor SNS corresponding to the position in which the movable member is precisely disposed on the information track.

A driving servo mode in which the movable member moves in a forward direction will be described hereinjustbelow. A forward driving command signal "Hi" is generated from the first output terminal 1A of the control 1 by operation of the operator. At that time, the output signal from the output terminal 1B is kept at "Lo". Therefore, a second reference signal Vr2 which is produced by dividing the output voltage +Vc from the operational amplifier 2 by the resistors R3 and R5 is applied to the (+) input terminal of the operational amplifier 4. Thus, a driving signal is applied from the operational amplifier 4 to the motor 14 to begin to move the movable member in a forward direction. The position sensor SNS generates the output signal Vs of sinewave voltage and the controlled section 8 generates an alernating output signal Vr in response to the output signal Vs from the position sensor SNS.

In response to a negative polarity half of the alternating output signal Vr, the output signal of the comparator 9 becomes "Lo" and the output signal of the EXOR gate 7 becomes "Hi". Accordingly, the output signal of the AND gate 6 becomes "Hi", which causes the movable contact 10A of the switch 10 to change to the fixed contact 10B during the negative polarity half of the output signal Vr. While the switch 10 is moved to the fixed contact 10B, the operational amplifier 11 serves as an inverting amplifier of gain 1 under the condition of R6=R7 and applies a signal produced by inverting the output signal Vr to the (−) input terminal of the operational amplifier 4. It should be noted that at that time the operational amplifier 11 serves as a voltage follower while the switch is positioned at the fixed contact 10C in response to a positive polarity half of the alternating output signal Vr in the same manner as aforementioned. Thus, when the movable member is moved to generate the alternating output signal Vr from the controlled section 8, a signal Vq which is produced by rectifying the output signal Vr in a full-wave manner is applied to the (−) input terminal of the operational amplifier 4.

In this case, the gain of the differential circuit formed by the operational amplifier 4 can be expressed by the following formula.

$$Vm = A \cdot (Vr2 - Vq)$$

in which A is equl to R3/R5=R4/R5=R9/R10.

FIG. 4 shows waveforms of the second reference signal Vr2, the alternating output signal Vr and the rectified signal Vq. Since the frequnecy of the output signal Vs from the position sensor Vs is high, the operational amplifier 13 serves as a differenttiating amplifier and as a result, the alternating output signal Vr from the controlled section 8 has a waveform produced by defferentiating the output signal Vs.

Thus, it will be noted that when the second reference signal Vr2 is applied to the (+) input terminal of the operational amplifier 4 and the rectified signal Vq is applied to thw (−) input terminal of the operational amplifier 4, the servo loop serves to move the movable member to the point where the second reference signal Vr2 crosses the positive inclination region of the rectified signal Vq, but the movable member continues to move due to its inertia without stopping. At that time, since the servo loop serves as the differentiating servo, the alternating output signal Vr of voltage from the controlled section 8 is proportional to a velocity of movement of the movable member and therefore the rectified signal Vq of voltage is also proportional to the velocity of movement of the movable member. Thus, if the velocity of forward movement of the movable member is lowered, then the rectified signal Vq of voltage becomes lower than the second reference signal Vr2, which causes the servo loop to serve to increase the velocity of forward movement of the movable member. Reversely, if the velocity of forward movement of the movable member increases, then the servo loop serves to lower the forward movement of the movable member. Thus, it will be noted that the servo loop drives the movable member at constant velocity. It will be understood that the velocity of movement of the movable member can be set at a predetermined value by the value of the second reference signal Vr2.

The output of the EXOR gate 7 becomes "Hi" at the zero cross point of the positive inclination region of the alternating output signal Vr from the controlled section 8 and becomes "Lo" at the zero cross point of the negative inclination region to provide the input terminal 1C of the control 1 with the position information of the movable member.

The control 1 can move the movable member to the selected position of information tracks. For example, when the movable member is required to move from the position in which it is disposed at one zero cross point to the position in which it is disposed at n-numbered zero cross point (n is positive integer), the first output terminal 1A of the control 1 continues to be "Hi" and the second output terminal 1B of the control 1 continues to be "Lo" until the n-numbered raised signal is applied to the input terminal 1C of the control 1. The first and second output terminals 1A and 1B are made "Lo" in response to the n-numbered raised signal whereby the positioning servo is returned.

Although, in the aforementioned description, the movable member is moved in the forward direction, it may be moved in a reverse direction, in which the first output signal 1A of the control 1 is made "Lo" while the second output signal 1B of the control 1 is made "Hi". The operation in reverse movement of the movable member is substantially identical to that in forward movement of the movable member except for reverse polarity of the signals.

Although, in the illustrated embodiment, the alternating output signal Vr is converted into a full-wave rectified signal, it will be understood that it may be converted into a half-wave rectified signal.

While one preferred embodiment of the invention has been described and illustrated with reference to the accompanying drawings, it will be understood by those skilled in the art that it is by way of example and that various changes and modifications may be made without departing from the spirit and scope of the invention, which is intended to be defined only to the appended claims.

What is claimed is:

1. A servo system for positioning and driving a movable member comprising:
   means to generate a position signal of sinewave form in response to movement of said movable member with the frequency of said position signal depending on the velocity of movement of said movable member;
   means to differentitate said position signal of sinewave form and to rectify the thus differentiated signal to generate a modified signal;
   means to selectively generate one of first and second reference signals of different DC voltages;
   means to selectively compare said position signal with said first reference signal to generate a first control signal or to selectively compare said modified signal with said second reference signal to generate a second control signal;
   and means to control said movable member to position said movable member in response to said first control signal and to drive said movable member in response to said second control signal.

2. A servo system for positioning and driving a movable member as set forth in claim 1, wherein said first reference signal is 0 V.

3. A servo system for positioning and driving a movable member as set forth in claim 1, wherein said means to differentiate and rectify said position signal genarates a full-wave modified signal.

4. A servo system for positioning and driving a movable member as set forth in claim 1, wherein said means to differentiate and rectify said position signal generates a half-wave modified signal.

* * * * *

UNITED STATES PATENT AND TRADEMARK OFFICE
CERTIFICATE OF CORRECTION

PATENT NO. : 4,659,972

DATED : April 21, 1987

INVENTOR(S) : Gohji Uchikoshi/Akio Terada

It is certified that error appears in the above-identified patent and that said Letters Patent is hereby corrected as shown below:

Column 3, line 33, "$Wx = x \cdot \sigma \cdot Rm/\phi x$"
   should be --$Vx = x \cdot \sigma \cdot Rm/\phi x$--

Column 4, line 29, "alernating"
   should be --alternating--

Signed and Sealed this

Fifteenth Day of December, 1987

Attest:

DONALD J. QUIGG

*Attesting Officer*          *Commissioner of Patents and Trademarks*